United States Patent Office 3,192,228
Patented June 29, 1965

3,192,228
N-(AMINOALKYL)-ENDO-PERHYDRO-4,7-METHANOISOINDOLES
James W. Bolger, Canoga Park, Calif., assignor to Rexall Drug and Chemical Company, Los Angeles, Calif., a corporation of Delaware
No Drawing. Filed July 27, 1962, Ser. No. 213,048
2 Claims. (Cl. 260—319)

This invention relates to compositions of matter classified in the art of chemistry as substituted isoindoles.

The invention sought to be patented resides in the concept of a chemical compound in which there is attached to the nitrogen atom of an endo-perhydro-4,7-methanoisoindole nucleus or its hereinafter disclosed equivalent an amino-lower alkyl substituent.

As used throughout the specification and in the claims the term "lower alkyl" and "lower alkylene" embrace straight and branched chain alkyl and alkylene radicals, respectively, containing 1 to 6 carbon atoms, and the term "amino" denotes the monovalent, basic —NH$_2$ group and its lower alkyl substituted derivatives.

The tangible embodiments of this invention possess the inherent general physical characteristics of being, in the form of their acid addition salts, white crystalline solids. Spectral data reveal no unsaturation except as present in the benzene ring of the equivalent 7a-phenyl substituted compound. These aforementioned physical characteristics, taken together with the nature of the starting materials and mode of synthesis, positively confirm the structure of the compounds sought to be patented.

The tangible embodiments of this invention possess the inherent applied use characteristics of having pharmacological activity as anti-hypertensive and local anesthetic agents as determined by recognized and accepted pharmacological test procedures, and in addition, are valuable chemical intermediates in the preparation of other substituted isoindoles having sufficient pharmacological activity. For example, treatment of these compounds with S-alkylisothiourea or O-alkylisourea yields the pharmacologically active N-guanidino-lower alkyl-endo-perhydro-4,7-methanoisoindoles which are described and claimed in my application entitled, "N-(Guanidinoalkyl)-Endo-Perhydro-4,7-Methanoisoindoles," Serial No. 213,-049, filed July 27, 1962.

The manner and process of making and using the invention will now be generally described so as to enable a person skilled in the art of chemistry to make and use the same as follows:

The starting materials for the compounds of this invention, N-halo-lower-alkyl-endo-perhydro-4,7-methanoisoindoles and their 7a substituted equivalents are prepared according to the method described in my application entitled, "N-(Haloalkyl)-Endo-Perhydro-4,7-Methanoisoindole," Serial No. 213,050, filed July 27, 1962, issued January 21, 1964, as U.S. Patent 3,118,905.

The preparation of the tangible embodiments of this invention is illustrated as follows:

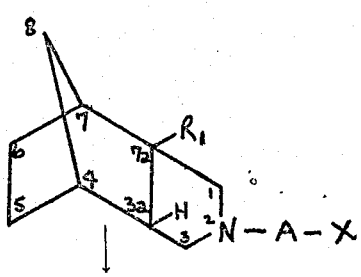

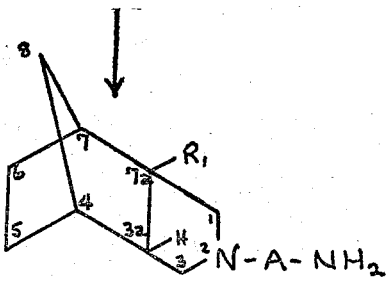

where A is lower alkylene, R$_1$ is hydrogen or its hereinafter disclosed equivalent and X is halogen.

Starting materials bearing at the 7a-position a lower alkyl or phenyl group, or such groups bearing one or more substituents as lower alkoxy, halogen, trifluoromethyl, or lower alkyl in the case of phenyl, are the full equivalents of the N-halo-lower-alkyl-endo-perhydro-4,7-methanoisoindole starting materials in the foregoing reaction sequence, thereby to produce 7a-substituted N-amino-lower-alkyl finished products which have the same utility as N-amino-lower-alkyl-endo-perhydro-4,7-methanoisoindole.

The reaction sequence depicted hereinabove is carried out by treating the starting material, in the form of its free base, with liquid ammonia at a temperature of from about 60° C. to about 160° C. in the presence of an organic solvent such as benzene, tetrahydrofuran, dimethyl sulfoxide, methanol, ethanol and the like. Although liquid ammonia is the preferred aminating agent, other materials such as ammonium hydroxide, dimethyl amine, diethylamine and the like may also be used.

After amination the N-aminoalkyl-endo-perhydro-4,7-methanoisoindoles and their 7a-substituted equivalents are crystallized and recovered by conventional methods.

Alternately, the starting materials for the preparation of N-amino-lower-alkyl-endo-perhydro - 4,7 - methanoisoindole and their 7a-substituted equivalents are the N-cyano-lower-alkyl-endo-perhydro - 4,7 - methanoisoindoles and their 7a-substituted equivalents, which are prepared according to the method described in my application entitled, "N - (Cyanoalkyl)-Endo-Perhydro-4,7-Methanoisoindoles," Serial No. 213,004, filed July 27, 1962, issued March 10, 1964, as U.S. Patent 3,124,594. The reaction is carried out by catalytic hydrogenation of the starting material in the presence of liquid ammonia and an inert solvent such as alcohol, tetrahydrofuran, benzene, cyclohexane and the like, and employing as catalyst Raney nickel or a noble metal catalyst such as platinum or palladium.

The tangible embodiments of the this invention can, if desired, be converted into their non-toxic pharmaceutically acceptable acid addition and quaternary ammonium salts by conventional procedures. Typical acid addition salts include the hydrochloride, hydrobromide, citrate, maleate, sulfate, nitrate and the like. Typical quaternary ammonium salts are those formed with such alkyl halides as methyl iodide, ethyl bromide, n-hexyl bromide and the like. Such salts are the full equivalents of the free bases and are included within the scope of this invention.

The tangible embodiments of this invention, either as the free base or in the form of a non-toxic pharmaceutically acceptable acid addition or quaternary ammonium salt, may be combined with conventional diluents and carriers, to form such dosage forms as tablets, capsules, solutions, suspensions, suppositories and the like.

The best mode contemplated by the inventor for carrying out this invention will now be set forth as follows:

EXAMPLE 1

*N-(2'-aminoethyl)-endo-perhydro-4,7-methanoisoindole dihydrochloride*

N-(2'-chloroethyl)-endo-perhydro - 4,7 - methanoisoindole hydrochloride (20 g., 0.085 mole) is dissolved in a minimum of water. The solution is made basic to pH 11 with concentrated sodium hydroxide solution. The solution is extracted with ether. The ether is removed by evaporation and the residue is mixed with 200 ml. of methanol. The solution is cooled to dry ice temperature and then 40 ml. of liquid ammonia is added. The resulting solution is then autoclaved at 110° C. for 20 hours. The reaction mixture is reduced to a salt cake in vacuo. The residue is dissolved in a minimal amount of water and the solution is made basic to pH 11 with sodium hydroxide. The product is extracted with ether, the ether is removed by evaporation and the residue distilled in vacuo. Anhydrous ether (200 ml.), saturated with gaseous hydrogen chloride, is added to the dried ether extract. White crystals are obtained. Yield: 10.5 g. (69%), B.P. 90°–93° C./1 mm. Hg. Equivalent weight: calculated, 90; found 93. The white crystals are recrystallized from ethanol/ether (anhydrous), M.P. 234–235° C.

*Analysis.*—Calculated for $C_{11}H_{20}N_2 \cdot 2HCl$: C, 52.17%; H, 8.76%. Found: C, 52.29%; H, 8.55%.

EXAMPLE 2

*N-(3'-aminopropyl)-endo-perhydro-4,7-methanoisoindole dihydrochloride*

N-(2'-cyanoethyl)-endo-perhydro-4,7-methanoisoindole (40 g, 0.21 mole) is mixed with 100 ml. of ethanol, 25 ml. of liquid ammonia and 10 g. of Raney nickel catalyst. The mixture is hydrogenated at 90° C. and 600 p.s.i. (94% hydrogen uptake is observed). The catalyst is removed by filtration. Upon addition of a saturated anhydrous hydrogen chloride ether solution (200 ml.) an oil is obtained which is washed several times with anhydrous ether, then dissolved in anhydrous ethanol. Anhydrous ether is added to induce crystallization. The crude product is recrystallized from ethanol/ether (anhydrous). Yield: 35 g. (62%) of white crystals, M.P. 180°–182° C. (very hygroscopic).

*Analysis.*—Calculated for $C_{12}H_{24}N_2Cl_2$: C, 53.94%; H, 9.05%; Cl, 26.53%. Found: C, 53.2%; H, 9.8%; Cl, 26.46%.

The following examples illustrate the preparation of other tangible embodiments of this invention:

EXAMPLE 3

*N-(2'N',N'-dimethylaminoethyl)-endo-perhydro-4,7-methanoisoindole dihydrochloride*

N-(2'-chloroethyl) endo-perhydro - 4,7 - methanoisoindole (20 g., 0.085 mole) is converted to the free base and dissolved in 200 ml. of methanol. Anhydrous dimethylamine is added in excess and the mixture is autoclaved at 110° C. for 20 hours. The resulting solution is reduced to a salt cake in vacuo, dissolved in water and made strongly basic with concentrated sodium hydroxide. The product is extracted from the aqueous solution with ether. Anhydrous ether (200 ml.), saturated with hydrogen chloride, is added to the dried ether extract. White crystals are obtained. The crude product is recrystallized from methanol/ether (anhydrous). Yield: 16.2 g. (68%) of white crystals, M.P. 286° C.

*Analysis.*—Calculated for $C_{13}H_{26}N_2Cl_2$: C, 55.50%; H, 9.32%; N, 9.96%. Found: C, 55.19%; H, 9.30%; N, 9.64%.

EXAMPLE 4

*N-(2'-aminopropyl)-endo-perhydro-4,7-methanoisoindole dihydrochloride*

N - (2'-chloropropyl)-endo-perhydro-4,7-methanoisoindole hydrochloride (15 g., 0.06 mole) is converted to the free base and mixed with 200 ml. of methanol and 40 ml. of liquid ammonia. The mixture is autoclaved at 110° C. for 20 hours. The solution is reduced to a salt-cake in vacuo. The salt cake is dissolved in water and made strongly basic with concentrated sodium hydroxide solution. The product is extracted with ether and the resulting solution is dried over magnesium sulfate. The product is obtained as white crystals by saturating the ethereal solution with hydrogen chloride gas. The crude product is recrystallized from ethanol/ether (anhydrous). Yield: 7.0 g. (44%), M.P. 213°–215° C.

*Analysis.*—Calculated for $C_{12}H_{24}N_2Cl_2$: C, 53.93%; H, 9.05%; Cl, 26.54%. Found: C, 53.7%; H, 9.2%; Cl, 26.7%.

EXAMPLE 5

*N-(2'-amino-1'-methylethyl)-endo-perhydro-4,7-methanoisoindole dihydrochloride*

N - (2'-chloro-1'-methylethyl)-endo-perhydro-4,7-methanoisoindole hydrochloride (12 g., 0.048 mole) is converted to the free base and mixed with 200 ml. of methanol and 30 ml. of liquid ammonia. The solution is autoclaved for 20 hours at 110° C. The solution is then reduced to a salt-cake in vacuo. The salt cake is dissolved in a minimal amount of water and made strongly basic with concentrated sodium hydroxide. The product is extracted with ether. After drying the ethereal solution over anhydrous magnesium sulfate, the product is obtained as white crystals by saturating the solution with gaseous hydrogen chloride. The crude product is recrystallized from ethanol/ether (anhydrous). Yield: 9.5 g. (~74%), M.P. 201°–203° C.

*Analysis.*—Calculated for $C_{12}H_{24}N_2Cl_2$: C, 53.93%; H, 9.05%; Cl, 26.54%. Found: C, 54.01%; H, 9.10%; Cl, 26.46%.

EXAMPLE 6

*N-(2'-aminoethyl)-7a-methyl-endo-perhydro-4,7-methanoisoindole dihydrochloride*

N - (2'-chloroethyl)-7a-methyl-endo-perhydro-4,7-methanoisoindole hydrochloride (20 g., 0.08 mole) is converted to the free base and mixed with 200 ml. of methanol and 40 ml. of liquid ammonia. This solution is autoclaved for 20 hours at 110° C. and then reduced to a salt-cake in vacuo. The salt-cake is dissolved in water and made strongly basic with concentrated sodium hydroxide. The product is extracted with ether. After drying the ethereal solution over magnesium sulfate the product is obtained as white crystals by saturating the ethereal solution with gaseous hydrogen chloride. The crude product is recrystallized from ethanol/ether (anhydrous). Yield: 15.9 g. (75%), M.P. 269°–271° C.

*Analysis.*—Calculated for $C_{12}H_{24}N_2Cl_2$: C, 53.93%; H, 9.05%; Cl, 26.54%. Found: C, 53.7%; H, 8.9%; Cl, 26.40%.

EXAMPLE 7

*N-(2'-aminoethyl)-7a-phenyl-endo-perhydro-4,7-methanoisoindole dihydrochloride*

N - (2'-chloroethyl)-7a-phenyl-endo-perhydro-4,7-methanoisoindole hydrochloride (10 g., 0.032 mole) is converted to the free base and mixed with 200 ml. of methanol and 30 ml. of liquid ammonia. The resulting solution is autoclaved for 20 hours at 110° C. The solution is cooled and reduced to a salt-cake in vacuo. The salt cake is then dissolved in water and made strongly basic with concentrated sodium hydroxide solution. The product is extracted with ether and dried over anhydrous magnesium sulfate. The amine hydrochloride is obtained by saturating the ethereal solution with gaseous hydrogen chloride.

The crude hydrochloride is recrystallized from ethanol/ether (anhydrous). Yield: 7.2 g. (68%) of white crystals, M.P. 107° C.

*Analysis.*—Calculated for $C_{17}H_{26}N_2Cl_2$: C, 62.00%; H, 7.96%; Cl, 21.53%. Found: C, 61.7%; H, 7.9%; Cl, 21.3%.

The subject matter which the applicant regards as his invention is particularly pointed out and distinctly claimed as follows:

1. N-(2'-aminoethyl) - 7a - phenyl-endo-perhydro-4,7-methanoisoindole.
2. N-(amino-lower alkyl)-7a-phenyl-endo-perhydro-4,7-methanoisoindole.

References Cited by the Examiner

UNITED STATES PATENTS

| 3,084,167 | 4/63 | Rice | 260—319 |
| 3,100,776 | 8/63 | Poos | 260—319 |

FOREIGN PATENTS

| 1,122,068 | 1/62 | Germany. |
| 760,039 | 10/56 | Great Britain. |

IRVING MARCUS, *Primary Examiner.*

NICHOLAS S. RIZZO, *Examiner.*